(12) United States Patent
Gorecki et al.

(10) Patent No.: US 7,128,338 B2
(45) Date of Patent: Oct. 31, 2006

(54) VEHICLE AIRBAG ASSEMBLY, METHOD OF DEPLOYMENT AND MANUFACTURE

(75) Inventors: Michael W. Gorecki, Macomb, MI (US); Jason S. Foster, Waterford, MI (US); David R. Shawe, Oxford, MI (US); Mark J. Kirschmann, Clarkston, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 217 days.

(21) Appl. No.: 10/872,264

(22) Filed: Jun. 18, 2004

(65) Prior Publication Data

US 2005/0280249 A1 Dec. 22, 2005

(51) Int. Cl.
*B60R 21/16* (2006.01)
(52) U.S. Cl. .............................. 280/743.1; 280/730.2; 280/749
(58) Field of Classification Search ............. 280/730.2, 280/743.1, 749
See application file for complete search history.

(56) References Cited

U.S. PATENT DOCUMENTS 6,634,671 B1 * 10/2003 Heigl et al. ............... 280/743.2
6,695,342 B1 * 2/2004 Tanase et al. ............. 280/730.2
6,709,008 B1 3/2004 McGee et al.

* cited by examiner

Primary Examiner—Eric Culbreth
(74) Attorney, Agent, or Firm—Ralph E. Smith

(57) ABSTRACT

A vehicle airbag assembly, method of deployment and manufacture. The airbag assembly includes at least one inflatable portion and at least one non-inflatable portion. At least one mass is operably attached to the non-inflatable portion. Upon inflation of the inflatable portion, the mass provides a substantial tautness to the non-inflatable portion. The deployment method includes providing at least one inflatable portion and at least one non-inflatable portion. The airbag assembly is operably attached to the vehicle. A mass operably attached to the non-inflatable portion is provided. The inflatable portion is inflated. The non-inflatable portion of the airbag is extended substantially taut upon inflation of the inflatable portion with the mass. The manufacturing method includes forming at least one inflatable portion and at least one non-inflatable portion. At least one mass is operably attached to the non-inflatable portion. The mass is adapted to provide a substantial tautness to the non-inflatable portion during airbag assembly deployment.

17 Claims, 3 Drawing Sheets

VEHICLE AIRBAG ASSEMBLY, METHOD OF DEPLOYMENT AND MANUFACTURE

TECHNICAL FIELD OF THE INVENTION

The present invention relates generally to vehicular airbags. More particularly, the invention relates to strategy for deploying and manufacturing a vehicle airbag.

BACKGROUND OF THE INVENTION

There have been many proposals concerning airbag arrangements to be utilized in motor vehicles, such as automobiles. In particular, it has been proposed to provide an airbag arrangement in the form of an inflatable curtain that, when inflated, is located adjacent a driver or occupant of a vehicle, being positioned between the driver or occupant of the vehicle and an adjacent side door or window opening.

Typically, an inflatable curtain of this type is initially stored within a housing or recess that follows a non-linear path across the top of the doorframe of the motor vehicle. The forward end of the recess or housing may extend down an "A"-Post of the motor vehicle, and the rear end of the recess or housing may extend partly down a "C"-Post or a post located to the rear of the "C"-Post. These opposing ends are centered by a "B"-Post.

When the airbag within the housing or recess is inflated, the airbag forms a curtain extending parallel with the longitudinal axis of the vehicle. The curtain is substantially vertical and extends from the roof line, above the door or window opening, to a position located at the lower edge of the window opening or substantially in alignment with the center of the chest of the driver or occupant of the vehicle.

Various attempts have been made to develop a side curtain that can be fabricated in such a way that when it is deployed, the lower-most region of the curtain extends fully downwardly. Many side curtain airbags designs include inflatable "A"-Post and "C"-Post portions flanking a mostly non-inflatable "B"-Post portion. When the airbag is deployed, the inflation pressure augments deployment of the "A" and "C"-Post portions (i.e. by projecting the airbag in the downward direction) but not the "B"-Post portion.

SUMMARY OF THE INVENTION

A first aspect of the present invention provides an airbag assembly for a vehicle. The airbag assembly comprises at least one inflatable portion and at least one non-inflatable portion. At least one mass is operably attached to the at least one non-inflatable portion. Upon inflation of the at least one inflatable portion, the mass provides a substantial tautness to the at least one non-inflatable portion.

A second aspect of the invention provides a method of deploying an airbag assembly for a vehicle. The method includes providing at least one inflatable portion and at least one non-inflatable portion of the airbag assembly. The airbag assembly is operably attached to the vehicle. A mass operably attached to the at least one non-inflatable portion is provided. The at least one inflatable portion is inflated. The mass extends the at least one non-inflatable portion of the airbag assembly and substantially renders it taut upon inflation of the at least one inflatable portion.

A third aspect of the invention provides a method of manufacturing an airbag assembly for a vehicle. The method includes forming at least one inflatable portion and at least one non-inflatable portion. At least one mass is operably attached to the at least one non-inflatable portion. The mass is adapted to provide a substantial tautness to the at least one non-inflatable portion during deployment of the airbag assembly.

The foregoing and other features and advantages of the invention will become further apparent from the following description of the presently preferred embodiments, read in conjunction with the accompanying drawings. The detailed description and drawings are merely illustrative of the invention, rather than limiting the scope of the invention being defined by the appended claims and equivalents thereof.

DESCRIPTION OF THE PRESENTLY PREFERRED EMBODIMENTS

Figure 1:
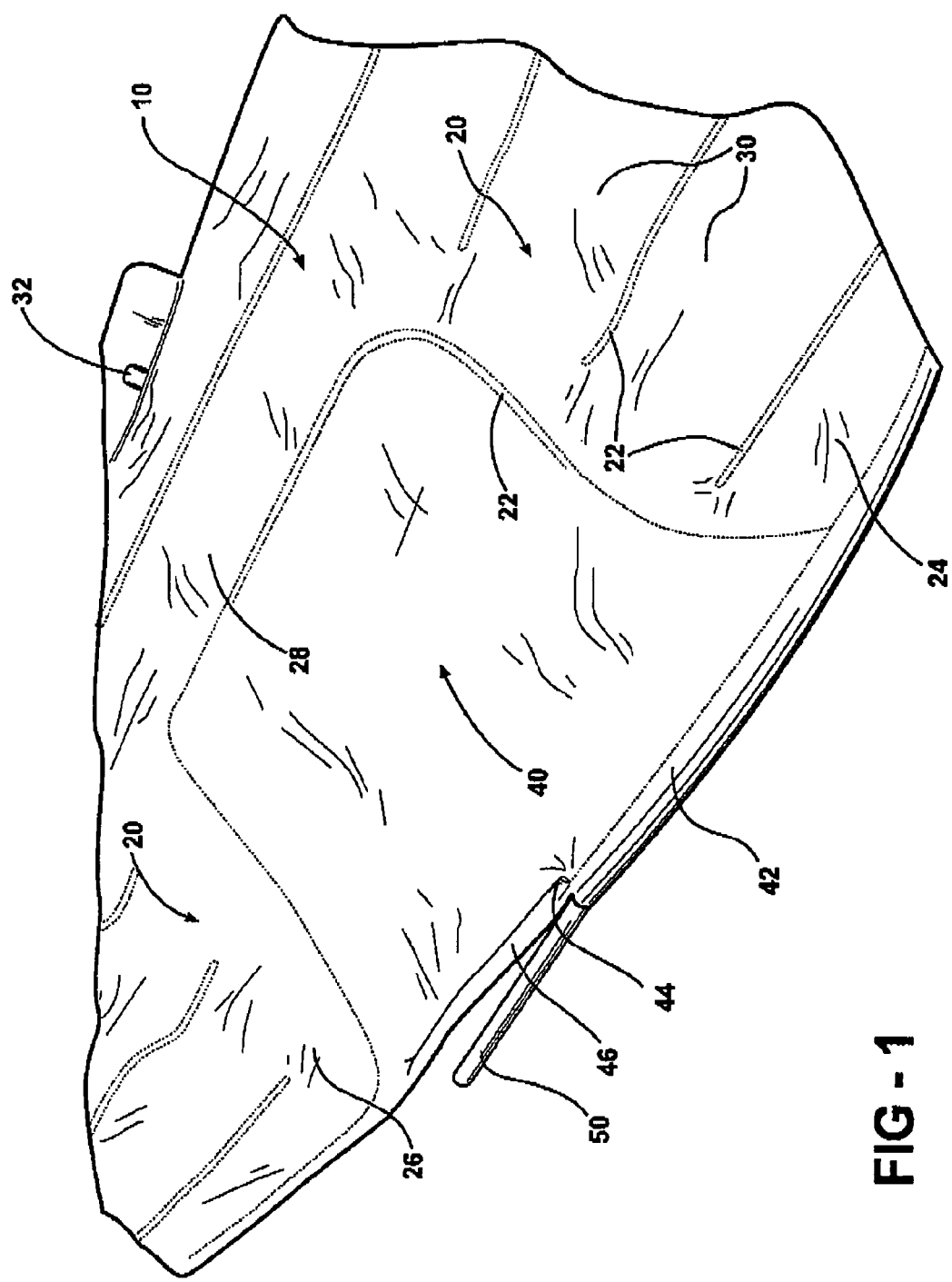
FIG. 1 is a perspective view of an airbag assembly for a vehicle, in accordance with one embodiment of the present invention.

Referring to the drawings, wherein like reference numerals refer to like elements, FIG. 1 is a perspective view of an airbag assembly for a vehicle, in accordance with one embodiment of the present invention. The airbag assembly is shown generally by numeral 10. Airbag assembly 10 includes at least one, in this case one, inflatable portion 20 and at least one, in this case one, non-inflatable portion 40. In one embodiment, as shown, the airbag assembly 10 may comprise a side-curtain airbag. In another embodiment, the airbag assembly 10 may comprise an airbag for protection of another portion of a vehicle, such as a rear or front airbag, and may depend on the configuration and design of an interior of the vehicle. As referred to herein, the term "taut" and "rigid" and their derivatives refer to a substantially complete downward deployment of the airbag assembly, which is desirable for its proper function and protection of vehicle occupant(s).

In one embodiment, the inflatable portion 20 comprises two adjacent layers of fabric, selected regions of which may be inter-connected (i.e. by using a one-piece weaving technique) to form seams 22 that define a plurality of discrete inflatable cells 30, which are generally rectangular in shape. An internal void is provided between the two adjacent layers thereby facilitating inflation with air or another fluid. The inflatable portion 20 may comprise a first section 24 and a second section 26 interconnected by an inflatable bridge section 28. First and second sections 24, 26 define the plurality of substantially horizontally extending, inflatable cells 30. It will be appreciated that size, length, number, and orientation of the inflatable cells 30 may vary. Further, the inflatable cells 30 may be inflated as one inflatable portion, as shown, or may, alternatively, comprise a plurality of inflatable portions.

A fill tube 32 may be operably attached to the inflatable portion 20 that is fluidly connected with an inflator, such as a gas generator. The inflator is adapted to be actuated in response to an accident, such as a side impact or a roll-over accident. Suitable inflators are known in the art. Non-inflatable portion 40 is flanked above and on both sides by the inflatable portion 20. Non-inflatable portion 40 is comprised of one layer of fabric or, alternatively, a plurality of fabric layers without an internal void for facilitating inflation.

At least one, in this case one, mass 50 is positioned adjacent an end portion 42 of the non-inflatable portion 40. In one embodiment, the mass 50 may comprise a substantially cylindrical member positioned within an aperture 44 formed along an edge of the non-inflatable portion 40. Mass 50 is shown in FIG. 1 positioned partially out of the aperture 44 for clarity. A flange portion 46 of the non-inflatable portion 40 may be used to form the aperture 44. For example, the flange portion 46 may be folded over itself and then operably attached (e.g. by sewing, bonding, welding, etc.) to the non-inflatable portion 40. Alternatively, the mass 50 may be operably attached to the non-inflatable portion 40 using a variety of alternative methods known in the art.

Mass 50 may be comprised of a non-inflatable resilient material such as foam, rubber, cloth, and the like. Those skilled in the art should recognize that the mass 50 may comprise a variety of other shapes, sizes, materials, attachment means, and the like for providing means for reliably deploying the non-inflatable portion 40. In addition, it should be appreciated that the size, shape, arrangement, and constitution of the airbag assembly may vary without departing from the spirit and scope of the present invention.

Figure 2:
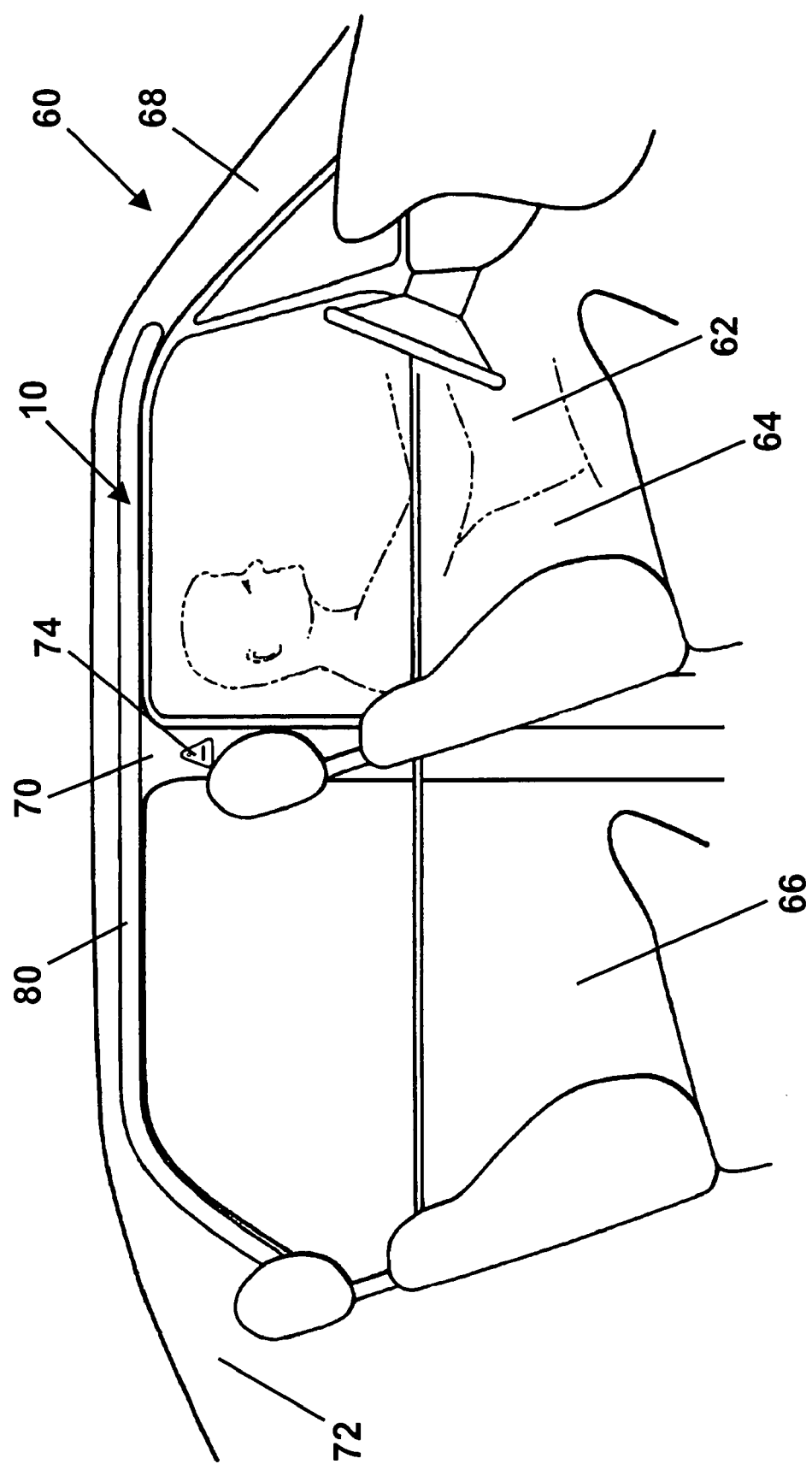
FIG. 2 is a diagrammatic view illustrating an interior of a vehicle, in this case an automobile, including the airbag assembly of FIG. 1 shown in an un-deployed state, in accordance with one embodiment of the present invention.

Referring now to FIG. 2, a diagrammatic view illustrates an interior of a vehicle 60, in this case an automobile, including the airbag assembly 10 shown in an un-deployed state. The illustrated part of the vehicle 60 includes a front door 62, located adjacent a vehicle driver 64, and a rear door 66. A window is provided for each door. An "A"-Post 68 is provided towards the front part of the front door 62, a "B"-Post 70 is provided between the front door 62 and the rear door 66, and a "C"-Post 72 is provided to the rear of the rear door 66. An airbag housing 80 is provided that extends from the "C"-Post 72, across the top of the rear door 66, across the top of the front door 62, and to the "A"-Post 68. Airbag housing 80 defines an internal void that accommodates the air-bag assembly 10 while in a folded and un-deployed state. A "D"-ring 74 is operably attached to the "B"-Post 70 as part of seatbelt assembly for the vehicle driver 64.

Figure 3:
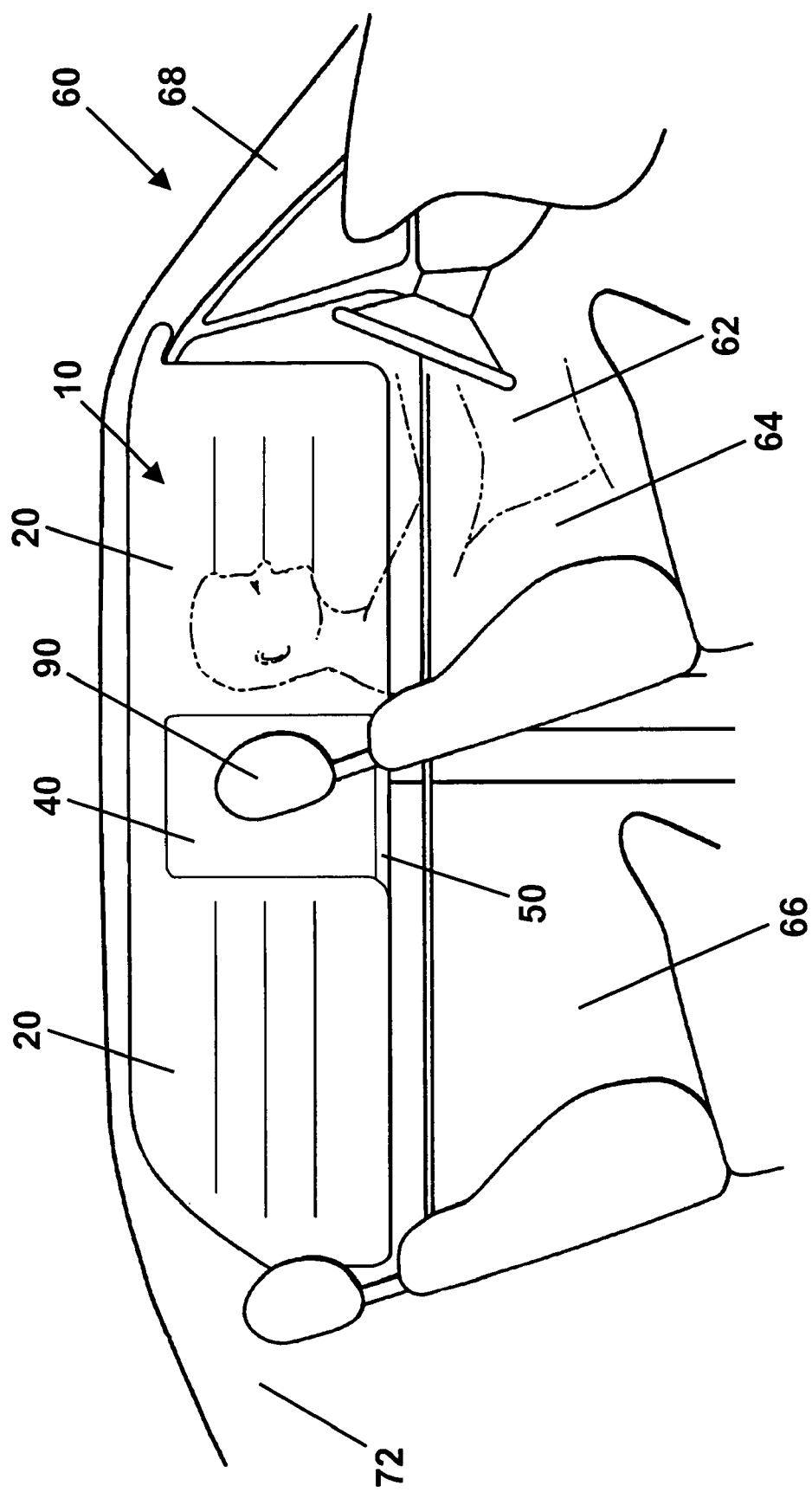
FIG. 3 is a diagrammatic view corresponding to FIG. 2, but showing the airbag assembly in a deployed state.

During a deployment, the inflator is activated thereby providing gas (or fluid) along the fill tube and into the inflatable portion 20. The airbag assembly 10 thus moves from the stored position within the housing to a deployed state as shown in FIG. 3. As the non-inflatable portion 40 does not inflate, it may not exhibit the taughtness and rigidity of the inflatable portion 20. Therefore, the non-inflatable portion 40 and therefore the airbag assembly 10 may, in some instances, not deploy properly. This may further be exacerbated by the presence of the seatbelt "D"-ring and objects such as a seat headrest 90, which can obstruct to the downward movement of the non-inflatable portion 40. Mass 50, however, helps to overcome some of the difficulties associated with improper airbag assembly 10 deployment, particularly that of the non-inflatable portion 40. For example, the mass 50 provides a substantially taut and rigid property of the non-inflatable portion 40 thereby preventing the head of the driver and/or occupants from being thrown outwardly through the window openings or, likewise, allowing objects from entering the vehicle 60 interior.

In one embodiment, the airbag assembly 10 is manufactured from one or more materials known in the art. For example, inflatable portion 20 is preferably manufactured from a flexible fabric material such as nylon, plastic, a polymeric material, polyester, and the like that remains air-tight during inflation. Non-inflatable portion 40 is preferably manufactured from a flexible fabric material such as nylon, plastic, canvas, a polymeric material, and the like that need not remain air-tight during an airbag deployment. Inflatable and non-inflatable portion 20, 40 may be comprised of woven material(s), such as a microfiber, or non-woven material(s) depending on their respective function and nature of the constituent material. Such materials may additionally be coated or laminated (e.g. with plastic) to provide resiliency, the aforementioned air-tight quality, and/or other favorable properties. As described previously, the inflatable portion 20 may be comprised of two layers of material including a void formed therein for allowing inflation. Non-inflatable portion 40 may be comprised of one or layers of material. Mass 50 is preferably manufactured from a non-inflatable resilient material such as foam, rubber, cloth, and the like. Inflatable portion 20, the non-inflatable portion 40, and the mass 50 may be attached one to another (where appropriate) using a variety of strategies known in the art including, but not limited to, sewing, bonding, welding, and the like. Further, the mass 50 may be attached to the non-inflatable portion 40 within an aperture formed by the flange portion 46, which is preferably positioned adjacent an end portion of the non-inflatable portion 40.

While the embodiments of the invention disclosed herein are presently considered to be preferred, various changes and modifications can be made without departing from the spirit and scope of the invention. The vehicle airbag assembly, method of deployment and manufacture are not limited to any particular design or arrangement. For example, the inflatable portion, non-inflatable portion, mass, and the materials and construction thereof may vary without limiting the utility of the invention.

Upon reading the specification and reviewing the drawings hereof, it will become immediately obvious to those skilled in the art that myriad other embodiments of the present invention are possible, and that such embodiments are contemplated and fall within the scope of the presently claimed invention. The scope of the invention is indicated in the appended claims, and all changes that come within the meaning and range of equivalents are intended to be embraced therein.

The invention claimed is:

1. An airbag assembly for a vehicle, the assembly comprising:
   at least one inflatable portion of an airbag of the airbag assembly;
   at least one non-inflatable portion of the airbag including at least one mass comprised of a resilient material and operably attached thereto; wherein upon inflation of the at least one inflatable portion, the mass provides a substantial tautness to the at least one non-inflatable portion.

2. The assembly of claim 1 wherein the at least one mass is positioned adjacent an end portion of the at least one inflatable portion.

3. The assembly of claim 1 wherein the at least one mass is non-inflatable.

4. The assembly of claim 1 wherein the at least one mass comprises a cylindrical member.

5. The assembly of claim 1 wherein the at least one mass is positioned within an aperture formed within the at least one non-inflatable portion.

6. The assembly of claim 1 wherein the airbag assembly comprises a side-curtain airbag.

7. The assembly of claim 1 wherein the at least one non-inflatable portion is adapted to be positioned upon the inflation adjacent a "B"-Post portion of the vehicle.

8. An airbag assembly for a vehicle, the assembly comprising:
   at least one inflatable portion of an airbag of the airbag assembly;
   at least one non-inflatable portion of the airbag including at least one mass operably attached thereto;
   wherein the at least one mass is positioned within an aperture comprising a flange portion formed within the at least one non-inflatable portion;
   wherein upon inflation of the at least one inflatable portion, the mass provides a substantial tautness to the at least one non-inflatable portion.

9. A method of deploying an airbag assembly for a vehicle, the method comprising:
   providing at least one inflatable portion of an airbag of the airbag assembly and at least one non-inflatable portion of the airbag, the airbag assembly adapted to be operably attached to the vehicle;
   providing an aperture within a flange portion of the non-inflatable portion;
   providing a mass positioned within the aperture;
   inflating the at least one inflatable portion; and
   extending the at least one non-inflatable portion of the airbag substantially taut upon inflation of the at least one inflatable portion with the mass.

10. The method of claim 9 wherein the mass is positioned adjacent an end portion of the non-inflatable portion.

11. The method of claim 9 wherein the airbag assembly is adapted to be deployed adjacent a side portion of the vehicle.

12. The method of claim 11 wherein the at least one non-inflatable portion is adapted to be deployed adjacent a "B"-Post portion of the vehicle.

13. A method of manufacturing an airbag assembly for a vehicle, the method comprising:
   forming at least one inflatable portion of an airbag of the airbag assembly;
   forming at least one non-inflatable portion of the airbag; and
   operably attaching at least one mass comprised of a resilient material to the at least one non-inflatable portion; wherein the mass is adapted to provide a substantial tautness to the at least one non-inflatable portion during deployment of the airbag assembly.

14. The method of claim 13 wherein operably attaching the at least one mass comprises positioning the at least one mass adjacent an end portion of the at least one non-inflatable portion.

15. The method of claim 13 wherein operably attaching at least one mass comprises forming an aperture within the at least one non-inflatable portion, and positioning the at least one mass substantially within said aperture.

16. A method of manufacturing an airbag assembly for a vehicle, the method comprising:
   forming at least one inflatable portion of an airbag of the airbag assembly;
   forming at least one non-inflatable portion of the airbag; and
   operably attaching at least one mass to the at least one non-inflatable portion by forming an aperture within the at least one non-inflatable portion by operably attaching a flange portion of the at least one non-inflatable portion to another portion of the at least one non-inflatable portion;
   wherein the mass is adapted to provide substantial tautness to the at least one non-inflatable portion during deployment of the airbag.

17. The method of claim 16 wherein operably attaching the flange portion to the at least one non-inflatable portion comprises an attachment method selected from a group consisting of sewing, bonding, and welding.

\* \* \* \* \*